(12) United States Patent
Kagohara et al.

(10) Patent No.: US 7,074,496 B2
(45) Date of Patent: Jul. 11, 2006

(54) MULTILAYER ALUMINUM-BASE ALLOY SLIDE MEMBER

(75) Inventors: Yukihiko Kagohara, Inuyama (JP); Takeshi Hoshina, Inuyama (JP); Hideo Ishikawa, Inuyama (JP); Masaaki Sakamoto, Inuyama (JP)

(73) Assignee: Daido Metal Company LTD, Nagoya (JP)

( * ) Notice: Subject to any disclaimer, the term of this patent is extended or adjusted under 35 U.S.C. 154(b) by 54 days.

(21) Appl. No.: 10/857,923

(22) Filed: Jun. 2, 2004

(65) Prior Publication Data
US 2004/0247932 A1 Dec. 9, 2004

(30) Foreign Application Priority Data
Jun. 4, 2003 (JP) ............... 2003-159088

(51) Int. Cl.
*B32B 15/20* (2006.01)
*F16C 33/12* (2006.01)
(52) U.S. Cl. ............... 428/654; 428/653; 428/925; 384/912
(58) Field of Classification Search ........... 428/654
See application file for complete search history.

(56) References Cited
U.S. PATENT DOCUMENTS 5,112,416 A * 5/1992 Tanaka et al. ............ 148/437
5,362,574 A * 11/1994 Tanaka et al. ............ 428/643
5,384,205 A * 1/1995 Tanaka et al. ............ 428/643
5,470,666 A * 11/1995 Tanaka et al. ............ 428/653
5,601,371 A * 2/1997 Koroschetz et al. ........ 384/276
6,413,654 B1 * 7/2002 Kagohara et al. ........... 428/653
2004/0028939 A1 * 2/2004 Kagohara et al. ........... 428/650

FOREIGN PATENT DOCUMENTS
GB   2369162 A    5/2002
GB   2 391 913 A  2/2004
JP   03-168411    7/1991

OTHER PUBLICATIONS
Office Action (and English translation) issued by the German Patent and Trademark Office on Jul. 27, 2005.*

* cited by examiner

Primary Examiner—John J. Zimmerman
(74) Attorney, Agent, or Firm—Browdy and Neimark, PLLC

(57) ABSTRACT

A multilayer aluminum-base alloy bearing formed by bonding a bearing alloy layer made of an aluminum-base alloy to a steel back metal through an intermediate layer made of an aluminum-base alloy, the intermediate layer being composed of two layers, that is, a lower layer and an upper layer, the lower layer in contact with the steel back metal being lower in hardness than the upper layer. Since the lower layer is soft, it is excellent in bonding property for the back metal, and since the upper layer is hard, it withstands a load exerted on the bearing alloy layer.

15 Claims, 1 Drawing Sheet

MULTILAYER ALUMINUM-BASE ALLOY SLIDE MEMBER

TECHNICAL FIELD

The invention relates to a multilayer aluminum-base alloy slide member formed by bonding a slide alloy layer made of an aluminum-base alloy to a back metal layer through an intermediate layer made of an aluminum-base alloy.

BACKGROUND OF THE INVENTION

Conventionally, Al—Sn base, Al—Sn—Si base, Al—Zn base materials are known as a slide alloy made of an aluminum-base alloy, for example, an aluminum-base bearing alloy for internal combustion engines. The aluminum-base bearing alloy is generally bonded to a steel back metal through an intermediate layer made of pure aluminum or an aluminum-base alloy and is manufactured as bearings.

In order to cope with a high output power in recent internal combustion engines, ones having an excellent fatigue resistance and a high strength have been developed among such aluminum-base bearing alloys. Since soft materials exhibit a favorable bonding property, however, pure aluminum or aluminum-base bearing alloys having a low hardness have been used as an intermediate layer. However, when a high load is acted on that intermediate layer, for which pure aluminum or aluminum-base bearing alloys having a low hardness are used, plastic deformation is caused due to softness thereof and the intermediate layer is squeezed out from bearing end surfaces.

In order to solve the problem, there has been proposed an aluminum-base alloy bearing, in which an intermediate layer has a Vickers hardness that is 40% or more but 70% or less of the hardness of an aluminum-base bearing alloy, the intermediate layer has a Vickers hardness of 25 or more, and the aluminum-base bearing alloy has a Vickers hardness of 50 or more (JP-B2-2564012).

Intermediate layers having a low hardness have been used in order to improve the bonding property of an aluminum-base bearing alloy for a steel back metal. When an aluminum-base bearing alloy having a high hardness is used in order to cope with a high output power of engines, an intermediate layer having a hardness that amounts to 40% or more of the hardness of the aluminum-base bearing alloy is satisfactory in terms of fatigue resistance but is too hard and poor in bonding property.

SUMMARY OF THE INVENTION

The invention has been thought of in view of the situation described above and has its object to provide a multilayer aluminum-base alloy slide member formed by bonding an aluminum-base slide alloy layer to a back metal layer through an intermediate layer made of an aluminum-base alloy, the multilayer aluminum-base alloy slide member being capable of achieving an improvement in bonding property while maintaining a high fatigue resistance in the intermediate layer.

The invention provides a multilayer aluminum-base alloy slide member formed by bonding a slide alloy layer made of an aluminum-base alloy to a back metal layer through an intermediate layer made of an aluminum-base alloy, the intermediate layer being composed of a layer in contact with the back metal layer and at least one layer disposed toward the slide alloy layer from the layer in contact with the back metal layer, and at least one of those layers, which are disposed toward the slide alloy layer from the layer in contact with the back metal layer, being higher in hardness than the layer in contact with the back metal layer.

The multilayer aluminum-base alloy slide member is ordinarily manufactured by performing roll bonding on an aluminum alloy plate that constitutes the slide alloy layer, and an aluminum alloy plate that constitutes the intermediate layer, to manufacture a composite aluminum alloy plate and performing roll bonding on the composite aluminum alloy plate to a steel sheet.

Therefore, that portion of the intermediate layer, which contacts with the back metal layer, is demanded of an excellent bonding property to the back metal layer. Also, since that portion of the intermediate layer, which is disposed toward the slide alloy layer, is acted directly by a load that is exerted on the slide alloy layer by a mating member, the portion is especially demanded of the function of withstanding a high load.

According to the invention, the intermediate layer is composed of two or more layers as described above, and at least that one of the layers, which is disposed toward the slide alloy layer from the layer in contact with the back metal layer, is made higher in hardness than the layer in contact with the back metal layer, so that the hard layer withstands a high load and is not susceptible to plastic deformation that results in squeezing from end surfaces due to the high load. On the other hand, since the layer in contact with the back metal layer is comparatively low in hardness, that is, soft, it exhibits a favorable bonding property for the back metal layer. Thus, the intermediate layer according to the invention is excellent in fatigue resistance and bonding property to realize an extended life of the slide member.

At least that one of layers in the intermediate layer, which is disposed toward the slide alloy layer, preferably has a Hv (Vickers hardness) of 25 or more but 70 or less. In case of a Hv of 25 or more, the ability of preventing squeezing from end surfaces and fatigue, which are attributed to the softness of at least one of the layers, is especially high, and in case of a Hv of 70 or less, the property of plastic deformation such as in rolling, etc. and conformability become especially favorable. More preferably, the hardness of at least one of the layers is a Hv of 35 to 60.

According to the invention, all those layers, which are disposed toward the slide alloy layer from the layer in contact with the back metal layer, in the intermediate layer can be made higher in hardness than the layer in contact with the back metal layer. Thus, the intermediate layer is further enhanced in fatigue resistance.

Also, that layer, which is in contact with the back metal layer, in the intermediate layer has a thickness that is 5% or more but 50% or less of the thickness of the entire intermediate layer.

The layer in contact with the back metal layer is that portion of the intermediate layer, which exhibits a favorable bonding property for the back metal layer as described above. When the thickness of the layer amounts to 5% or more of a total thickness of the intermediate layer, the effect of restricting that breakage at the time of roll bonding, which is caused in the case where the layer is relatively too thin, is great, so that such thickness is especially advantageous in preventing a relatively hard layer toward the slide alloy layer from being exposed from a broken portion. Therefore, such thickness is especially excellent in obtaining a stable bonding strength.

The layer in contact with the back metal layer is lower in hardness than at least one of the layers disposed toward the slide alloy layer. When the thickness of the layer in contact with the back metal layer amounts to less than 50% of a total thickness of the intermediate layer, the intermediate layer becomes adequately high in mechanical properties and its ability of preventing plastic deformation leading to squeezing from end surfaces and fatigue is increased. Therefore, in the case where the thickness of the layer in contact with the back metal layer amounts to 5% or more but less than 50% of a total thickness of the intermediate layer, the ability of preventing fatigue starting from a bonding interface between the back metal layer and the intermediate layer and an interior of that layer of the intermediate layer, which is in contact with the back metal layer, is especially excellent. More preferably, the thickness of that layer of the intermediate layer, which is in contact with the back metal layer, amounts to 8 to 30% of a total thickness of the intermediate layer.

According to the invention, that layer, which is in contact with the back metal layer, in the intermediate layer can have a hardness that is 40% or more but less than 100% of the hardness of at least one of those layers, which are disposed toward the slide alloy layer from the layer in contact with the back metal layer.

In case of 40% or more, the load carrying capacity is especially excellent and the ability of preventing squeezing from end surfaces of the slide member and development into fatigue is especially excellent. In case of less than 100%, too much hardness is not involved, so that the property of plastic deformation such as in rolling, etc. and conformability are made especially excellent.

According to the invention, that layer, which is in contact with the back metal layer, in the intermediate layer can have a Vickers hardness of 30 or more, and the hardness of those layers, which are disposed toward the slide alloy layer from the layer in contact with the back metal layer, can have a Vickers hardness of 40 or more.

When the respective layers have a Hv of 30 or more and a Hv of 40 or more, an excellent load carrying capacity exhibits itself in use under a high load and the fatigue resistance is especially excellent.

According to the invention, that layer, which is in contact with the back metal layer, in the intermediate layer can contain one or more of the following substances (a) to (d):

(a) Si of 1 to 8.5 mass %

Reason: Si crystallizes as Si particles of high hardness as well as is solid-solved in Al to increase the hardness of an alloy. In case of 1 mass % or more, the effect is remarkable, and in case of 8.5 mass % or less, the property of plastic deformation such as ductility, etc. is especially excellent to enable ensuring an adequately stable bonding strength. 4 to 8 mass % is more preferable.

(b) one or more elements selected from Cu, Zn, and Mg and having a total amount of 0.01 to 7 mass %

Reason: These elements being selected enhance an Al matrix in strength. In case of 0.01 mass % or more, the effect is remarkable, and in case of 7 mass % or less, the ability of preventing generation of coarse intermetallic compounds is especially high, the property of plastic deformation such as in rolling, etc. is especially excellent, and bonding is made further stable. 0.5 to 6 mass % is more preferable.

(c) one or more elements selected from Mn, V, Mo, Cr, Co, Fe, Ni, and W and having a total amount of 0.01 to 3 mass %

Reason: These elements being selected are solid-solved in an Al matrix, or crystallize as intermetallic compounds or particles of each element, thereby enhancing the alloy in strength. In case of 0.01 mass % or more, the effect is remarkable, and in case of 3 mass % or less, the ability of preventing generation of coarse intermetallic compounds is especially high, and the property of plastic deformation such as in rolling, etc. is especially excellent. 0.2 to 2 mass % is more preferable.

(d) one or more elements selected from B, Ti, and Zr and having a total amount of 0.01 to 2 mass %.

Reason: These elements being selected are solid-solved in an Al matrix and effective in enhancing the fatigue strength. In case of 0.01 mass % or more, the effect is remarkable, and in case of 2 mass % or less, toughness becomes especially high. 0.02 to 0.5 mass % is more preferable.

DETAILED DESCRIPTION OF THE INVENTION

An embodiment of the invention will be described below with reference to FIG. 1.

Figure 1:
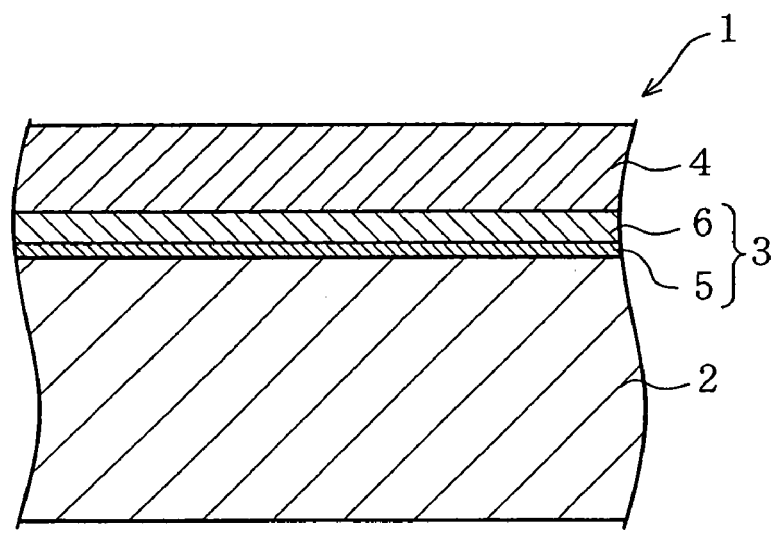
FIG. 1 is a cross sectional view showing an embodiment of the invention.

FIG. 1 shows a cross section of a multilayer aluminum-base alloy bearing 1 as a multilayer aluminum-base alloy slide member. As shown in the figure, the multilayer aluminum-base alloy bearing 1 is formed by bonding a bearing alloy layer 4 as a slide alloy layer made of an aluminum-base alloy to a back metal layer, for example, a steel back metal 2 through an intermediate layer 3 made of an aluminum-base alloy. The intermediate layer 3 is composed of a plurality of layers, for example, two layers, that is, a lower layer on a side of the steel back metal 2 and an upper layer 6 on a side of the bearing alloy layer 4.

The aluminum-base bearing alloy that constitutes the bearing alloy layer 4 contains one or more of the following substances (a) to (e) in addition to aluminum.

(a) Sn of 3 to 20 mass %

(b) one or more elements selected from Cu, Zn, Mg, and Si and having a total amount of 0.1 to 7 mass %

(c) one or more elements selected from Mn, V, Mo, Cr, Co, Fe, Ni, and W and having a total amount of 0.01 to 3 mass %

(d) one or more elements selected from B, Ti, and Zr and having a total amount of 0.01 to 2 mass %

(e) one or more elements selected from Pb, Bi, and In and having a total amount of 3 mass % or less Also, the lower layer 5 among the intermediate layer 3 composed of two layers contains at least one of the following substances (a) to (d) in addition to aluminum.

(a) Si of 1 to 8.5 mass %

(b) one or more elements selected from Cu, Zn, and Mg and having a total amount of 0.01 to 7 mass %

(c) one or more elements selected from Mn, V, Mo, Cr, Co, Fe, Ni, and W and having a amount of 0.01 to 3 mass %

(d) one or more elements selected from B, Ti, and Zr and having a amount of 0.01 to 2 mass %

On the other hand, the upper layer 6 contains at least one of Mn of more than 0 mass % but 2 mass % or less, Cu of more than 0 mass % but 2 mass % or less, Mg of more than 0 mass % but 2 mass % or less, and Fe of more than 0 mass % but 2 mass % or less.

Subsequently, an explanation will be given to a method of manufacturing the multilayer aluminum-base alloy bearing 1 shown in FIG. 1.

First, conventional casting and rolling are used to form an aluminum-base bearing alloy sheet that constitutes the bearing alloy layer 4. Also, conventional casting and rolling are used to form an aluminum alloy sheet that constitutes the lower layer 5 of the intermediate layer 3, and an aluminum alloy sheet that constitutes the upper layer 6, and the two aluminum alloy sheets are bonded together by roll bonding to form an aluminum alloy composite sheet for the intermediate layer. Then, the aluminum-base bearing alloy sheet and the aluminum alloy composite sheet for the intermediate layer are bonded together by roll bonding to form a multi layer aluminum alloy sheet.

Then, the multi layer aluminum alloy sheet is overlapped on a low carbon steel strip that constitutes the steel back metal to be subjected to roll bonding to form a bimetal obtained by bonding the aluminum-base bearing alloy sheet to the steel back metal through the aluminum alloy sheet for the intermediate layer.

In addition, the aluminum-base bearing alloy sheet is referred to as a bearing alloy layer 4, the aluminum alloy sheet for the intermediate layer is referred to as an intermediate layer 3, and the low carbon steel strip is referred to as a steel back metal 2 in the following descriptions.

After the bimetal is manufactured in the manner described above, the bimetal is subjected to annealing to be heated at about 350° C. for 3 hours, and thereafter the bimetal is worked in a semi-cylindrical shape or in a cylindrical shape to be manufactured as bearings.

After the bimetal is annealed, the bimetal may be subjected to solution heat treatment. The solution heat treatment is performed by heating the bimetal at 460 to 520° C. for 10 to 30 minutes. Cu, Zn, Mg, Si, etc. of the aluminum-base bearing alloy layer 4 are solid-solved in an Al matrix. After the solution heat treatment, the bimetal is quenched. Thereby, the bearing alloy layer 4 is increased in strength. Thereafter, the bimetal is worked in a semi-cylindrical shape or in a cylindrical shape to be manufactured as bearings. Further, after the bimetal is quenched, it may be subjected to artificial aging (for example, at 150 to 200° C. for 20 hours).

Here, when finished as bearings, the entire intermediate layer 3 has a total thickness of 10 to 70 μm, and the lower layer of the intermediate layer toward the back metal layer is set to have a thickness of 2 to 30 μm that is 3% or more but 60% or less of the total thickness. Also, the hardness of the upper layer 6 is a Hv 22 or more but 75 or less, and the lower layer 5 has a Vickers hardness that is 37% or more but less than 100% of the hardness of the upper layer 6. Preferably, the lower layer 5 has a Hv of 30 or more and the upper layer 6 has a Hv 40 or more.

Figure 2:
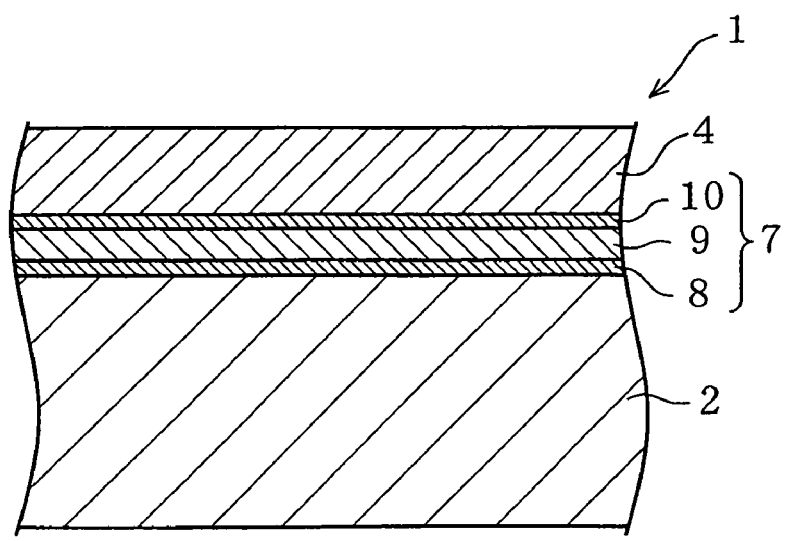
FIG. 2 is a cross sectional view showing a further embodiment of the invention and corresponding to FIG. 1.

FIG. 2 shows a further embodiment of the invention, the embodiment being different from the previous embodiment in that an intermediate layer 7 is three-layered in structure to be composed of a lower layer 8 in contact with the steel back metal 2, a central layer 9 bonded to the lower layer 8 and positioned toward the aluminum-base alloy bearing layer 4 from the lower layer 8, and an upper layer 10 bonded to the central layer 9 to contact with the aluminum-base alloy bearing layer 4.

The lower layer 8 and the upper layer 10 are made of an aluminum alloy having the same composition as that of the lower layer 5 and the upper layer 6 in the previous embodiment, and the central layer 9 may be made of an aluminum alloy having the same composition as that of the lower layer 5 and the upper layer 6 in the previous embodiment, or may be made of an aluminum alloy having a different composition therefrom. In this case, the hardness of the central layer 9 is preferably higher than that of the lower layer 8 and lower than that of the upper layer 10 but may be lower than that of the lower layer 8, or higher than that of the upper layer 10.

EXAMPLES

In order to confirm the effect of the invention, the inventors of the present application have manufactured aluminum-base alloy bearings having intermediate layers indicated in the following TABLE 1 and carried out bonding tests and fatigue tests thereon. Here, a bearing alloy layer in respective samples shown in TABLE 1 was composed of 13 mass % Sn, 3 mass % Si, 1.0 mass % Cu, and the remainder of Al. Further, any solution heat treatment was not performed.

The bonding strength tests were represented in terms of shear strength when the bearing alloy layer was peeled off from the steel back metal in parallel to the joint surface. Also, the conditions in the fatigue tests are illustrated in TABLE 2.

TABLE 1

| | | intermediate bonding layer | | | | | | | | | | | |
|---|---|---|---|---|---|---|---|---|---|---|---|---|---|
| | | | | | layer A | | | | | | | | |
| | sample No. | layer C hardness (Hv) | layer B harness (Hv) | ratio to total thickness of intermediate layers (%) | hardness (Hv) | ratio to hardness of layer B or C (%) | additional element (mass %) | | | | | bonding strength test bonding strength (MPa) | fatigue test maximum surface pressure without fatigue (MPa) |
| | | | | | | | Si | Cu | Zn | V | Ti | | |
| product of invention | 1 | 65 | 50 | 24 | 35 | 54 | 3.0 | 1.0 | 0.3 | 0.2 | — | 92 | 120 |
| | 2 | 60 | 45 | 20 | 22 | 37 | — | — | — | — | — | 90 | 115 |
| | 3 | 30 | 58 | 3 | 28 | 48 | — | 0.8 | 0.1 | — | 0.02 | 85 | 115 |
| | 4 | 28 | 54 | 60 | 25 | 46 | — | — | 0.5 | 0.4 | — | 90 | 115 |
| | 5 | 22 | 46 | 12 | 43 | 93 | 7.0 | 0.2 | 0.2 | — | 0.1 | 95 | 115 |
| | 6 | — | 75 | 33 | 31 | 41 | — | 0.5 | 2.0 | — | — | 90 | 115 |
| comparative product | 7 | 35 | 50 | 24 | 65 | 130 | 6.0 | 1.0 | 4.0 | — | — | 70 | 100 |
| | 8 | 22 | 45 | 20 | 60 | 133 | — | 2.3 | 5.0 | — | 0.1 | 68 | 100 |
| | 9 | 28 | 30 | 2 | 65 | 217 | 9.0 | — | — | — | — | 72 | 100 |
| | 10 | 28 | 73 | 63 | 80 | 110 | — | 4.0 | 5.0 | — | 0.1 | 65 | 95 |

TABLE 2

| | condition |
|---|---|
| testing machine | fatigue test machine |
| rotational speed | 9.0 m/s |
| testing time | 20 hours |
| lubricant | VG68 |
| oil temperature | 100° C. |
| oil supply pressure | 0.49 MPa |
| shaft material | JIS S55C |
| evaluation method | maximum surface pressure without fatigue |

Among the intermediate layers indicated in TABLE 1, some samples composed of layers A, B, C are of the three-layered structure shown in FIG. 2, the layer A being a lower layer, the layer B being a central layer, and the layer C being an upper layer. A sample without the layer C is of the two-layered structure shown in FIG. 1, the layer A being a lower layer, and the layer B being an upper layer.

In considering experimental results to make a comparison between products 1 and 2 of the invention and a product 7 of comparison, the product 7 of comparison is small in bonding strength and poor in fatigue resistance since the layer A (lower layer) thereof is high in hardness and insufficient in plastic deformability at the roll bonding.

In making a comparison between a product 3 of the invention and a product 9 of comparison, the product 9 of comparison is small in bonding strength and poor in fatigue resistance since the layer A (lower layer) thereof is high in hardness and insufficient in plastic deformability at the roll bonding, and the layer A (lower layer) is thin and the layer B (central layer) and the layer C (upper layer), which are low in hardness, become relatively thick, so that squeezing from bearing end surfaces is generated.

In making a comparison between a product 4 of the invention and a product 10 of comparison, the product 10 of comparison is small in bonding strength and poor in fatigue resistance since the layer A (lower layer) thereof is high in hardness and insufficient in plastic deformability at the roll bonding, and the layer A (lower layer) having a high hardness is thick to lead to a low conformability of bearings and a decrease in fatigue resistance.

In making a comparison between a product 5 of the invention and a product 8 of comparison, the product 8 of comparison is small in bonding strength and poor in fatigue resistance since the layer A (lower layer) thereof is high in hardness and insufficient in plastic deformability at the roll bonding, and fatigue is generated in the layer C (upper layer) having a low hardness.

The invention is not limited to the embodiments described above and shown in the drawings but affords the following extension or modification.

The intermediate layer is not limited to two layers and three layers but may be composed of four layers or more. In this case, it is preferable that a lowermost layer (layer in contact with a back metal) be softer than at least one of upper layers (layers toward a slide alloy) and have a thickness that is 5% or more but less than 50% of a total thickness of the intermediate layer.

The invention is not limited to bearings but widely applicable to slide members that bear moving mate members.

What is claimed is:

1. A multilayer aluminum-base alloy slide member formed by bonding a slide alloy layer made of an aluminum-base alloy to a back metal layer through intermediate layers made of an aluminum-base alloy, the intermediate layers being composed of:
   a first intermediate layer in contact with the back metal layer; and
   at least one second intermediate layer disposed toward the slide alloy layer from the first intermediate layer in contact with the back metal layer,
   at least one of said second intermediate layers, which are disposed toward the slide alloy layer from the first intermediate layer in contact with the back metal layer, being higher in hardness than the first intermediate layer in contact with the back metal layer, and
   wherein said first intermediate layer, which is in contact with the back metal layer, has a thickness that is 5% or more but less than 50% of the thickness of the entire intermediate layers.

2. A multilayer aluminum-base alloy slide member formed by bonding a slide alloy layer made of an aluminum-base alloy to a back metal layer through intermediate layers made of an aluminum-base alloy, the intermediate layers being composed of:
   a first intermediate layer in contact with the back metal layer; and
   at least one second intermediate layer disposed toward the slide alloy layer from the first intermediate layer in contact with the back metal layer;
   wherein said second intermediate layers, which are disposed toward the slide alloy layer from the first intermediate layer in contact with the back metal layer, are higher in hardness than the layer in contact with the back metal layer; and
   wherein said first intermediate layer, which is in contact with the back metal layer, has a thickness that is 5% or more but less than 50% of the thickness of the entire intermediate layers.

3. The multilayer aluminum-base alloy slide member according to claim 1, wherein said first intermediate layer, which is in contact with the back metal layer, has a hardness that is 40% or more but less than 100% of the hardness of said at least one second intermediate layer, which is disposed toward the slide alloy layer from the first intermediate layer in contact with the back metal layer.

4. The multilayer aluminum-base alloy slide member according to claim 2, wherein said first intermediate layer, which is in contact with the back metal layer, has a hardness that is 40% or more but less than 100% of the hardness of said at least one second intermediate layer, which is disposed toward the slide alloy layer from the first intermediate layer in contact with the back metal layer.

5. The multilayer aluminum-base alloy slide member according to claim 1, wherein at least one of said second intermediate layers, which are disposed toward the slide alloy layer from the first intermediate layer in contact with the back metal layer, has a Vickers hardness of 25 or more but 70 or less.

6. The multilayer aluminum-base alloy slide member according to claim 2, wherein at least one of said second intermediate layers, which are disposed toward the slide alloy layer from the first intermediate layer in contact with the back metal layer, has a Vickers hardness of 25 or more but 70 or less.

7. The multilayer aluminum-base alloy slide member according to claim 1, wherein said first intermediate layer, which is in contact with the back metal layer, has a Vickers hardness of 30 or more, and said second intermediate layer, which is disposed toward the slide alloy layer from the first intermediate layer in contact with the back metal layer, has a Vickers hardness of 40 or more.

8. The multilayer aluminum-base alloy slide member according to claim 2, wherein said first intermediate layer, which is in contact with the back metal layer, has a Vickers hardness of 30 or more, and said second intermediate layer, which is disposed toward the slide alloy layer from the first intermediate layer in contact with the back metal layer, has a Vickers hardness of 40 or more.

9. The multilayer aluminum-base alloy slide member according to claim 1, wherein said first intermediate layer, which is in contact with the back metal layer, contains one or more of the following substances (a) to (d):
   (a) Si of 1 to 8.5 mass %
   (b) one or more elements selected from the group consisting of Cu, Zn, and Mg and having a total amount of 0.01 to 7 mass %
   (c) one or more elements selected from the group consisting of Mn, V, Mo, Cr, Co, Fe, Ni, and W and having a total amount of 0.01 to 3 mass %
   (d) one or more elements selected from the group consisting of B, Ti, and Zr and having a total amount of 0.01 to 2 mass %.

10. The multilayer aluminum-base alloy slide member according to claim 2, wherein said first intermediate layer, which is in contact with the back metal layer, contains one or more of the following substances (a) to (d):
   (a) Si of 1 to 8.5 mass %
   (b) one or more elements selected from the group consisting of Cu, Zn, and Mg and having a total amount of 0.01 to 7 mass %
   (c) one or more elements selected from the group consisting of Mn, V, Mo, Cr, Co, Fe, Ni, and W and having a total amount of 0.01 to 3 mass %
   (d) one or more elements selected from the group consisting of B, Ti, and Zr and having a total amount of 0.01 to 2 mass %.

11. The multilayer aluminum-base alloy slide member according to claim 6,
   wherein said first intermediate layer, which is in contact with the back metal layer, has a hardness that is 40% or more but less than 100% of the hardness of at least one of said second intermediate layers, which are disposed toward the slide alloy layer from the first intermediate layer in contact with the back metal layer
   wherein said first intermediate layer, which is in contact with the back metal layer, has a Vickers hardness of 30 or more, and said second intermediate layer, which is disposed toward the slide alloy layer from the first intermediate layer in contact with the back metal layer, has a Vickers hardness of 40 or more, and
   wherein the first intermediate layer, which is in contact with the back metal layer, contains one or more of the following substances (a) to (d):
   (a) Si of 1 to 8.5 mass %
   (b) one or more elements selected from the group consisting of Cu, Zn, and Mg and having a total amount of 0.01 to 7 mass %
   (c) one or more elements selected from the group consisting of Mn, V, Mo, Cr, Co, Fe, Ni, and W and having a total amount of 0.01 to 3 mass %
   (d) one or more elements selected from the group consisting of B, Ti, and Zr and having a total amount of 0.01 to 2 mass %.

12. The multilayer aluminum-base alloy slide member according to claim 1, wherein said first intermediate layer, which is in contact with the back metal layer, contains one or more of the following substances (b) to (d):
   (b) one or more elements selected from the group consisting of Cu, Zn, and Mg and having a total amount of 0.01 to 7 mass %;
   (c) one or more elements selected from the group consisting of Mn, V, Mo, Cr, Co, Fe, Ni, and W and having a total amount of 0.01 to 3 mass %;
   (d) one or more elements selected from B, Ti, and Zr and having a total amount of 0.01 to 2 mass %.

13. The multilayer aluminum-base alloy slide member according to claim 2, wherein the first intermediate layer, which is in contact with the back metal layer, contains one or more of the following substances (b) to (d):
   (b) one or more elements selected from the group consisting of Cu, Zn, and Mg and having a total amount of 0.01 to 7 mass %;
   (c) one or more elements selected from the group consisting of Mn, V, Mo, Cr, Co, Fe, Ni, and W and having a total amount of 0.01 to 3 mass %
   (d) one or more elements selected from the group consisting of B, Ti, and Zr and having a total amount of 0.01 to 2 mass %.

14. The multilayer aluminum-base alloy slide member according to claim 1, wherein the first intermediate layer, which is in contact with the back metal layer, contains Si of 1 to 8.5 mass % and one or more of the following substances (b) to (d):
   (b) one or more elements selected from the group consisting of Cu, Zn, and Mg and having a total amount of 0.01 to 7 mass %;
   (c) one or more elements selected from the group consisting of Mn, V, Mo, Cr, Co, Fe, Ni, and W and having a total amount of 0.01 to 3 mass %;
   (d) one or more elements selected from B, Ti, and Zr and having a total amount of 0.01 to 2 mass %.

15. The multilayer aluminum-base alloy slide member according to claim 2, wherein the first intermediate layer, which is in contact with the back metal layer, contains Si of 1 to 8.5 mass % and one or more of the following substances (b) to (d):
   (b) one or more elements selected from the group consisting of Cu, Zn, and Mg and having a total amount of 0.01 to 7 mass %;
   (c) one or more elements selected from the group consisting of Mn, V, Mo, Cr, Co, Fe, Ni, and W and having a total amount of 0.01 to 3 mass %;
   (d) one or more elements selected from the group consisting of B, Ti, and Zr and having a total amount of 0.01 to 2 mass %.

* * * * *